INVENTOR.
Stirling A. McInnis
BY
George A. Schmidt
ATTORNEY

United States Patent Office 3,561,047
Patented Feb. 9, 1971

3,561,047
PLASTIC MIXING AND INJECTION SYSTEM
Stirling A. McInnis, 661 Kenyon St.,
Troy, Mich. 48084
Filed Mar. 4, 1968, Ser. No. 710,150
Int. Cl. B29f *1/06*
U.S. Cl. 18—4
19 Claims

ABSTRACT OF THE DISCLOSURE

Method and apparatus for preparing for and directing a mixture of plastic material and filler material into molding dies to form an article of manufacture. Preparation includes the melting of a thermoplastic material in a heated receptacle and continuously circulating the melted plastic through the receptacle with temperature control. A transfer valve may be operated to divert the circulating plastic material to a heated mixing receptacle where filler material is added, the temperature being controlled to assure complete wetting and mixing of the filler material by and with the liquid plastic. Continuous circulation through the mixing receptacle maintains the filler material in mechanical suspension in the mixture. A second transfer valve may be operated to divert the mixture into a heated holding receptacle for continuous circulation therethrough and, as needed, for conveyance to molding dies. Suitable valve means are provided to divert flow to the dies through an injection gun. Upon filling the dies, a multiple cylindered injection machine pressurizes the mixture through the gun to eliminate voids in the molded article and to compensate for shrinkage as the mixture cools.

---

This invention relates to apparatus and method for molding a mixture of plastic material and filler material, and more particularly to a system for treatment of the mixture prior to conveyance of the mixture to molding dies, the manner in which the mixture is conveyed into the molding dies and the apparatus for treatment, flow and injection of the mixture to produce a molded article.

In the design and production of many articles of manufacture, the use of plastic materials, and/or plastic materials combined with filler materials of one kind or another, is becoming increasingly more popular. The science of plastics is progressing and new materials are being developed which have sufficient properties to permit many articles to be produced of plastic rather than some other material, and usually in a more economical manner. The use of plastics and modern molding techniques permit articles of manufacture to be more easily formed to irregular shapes and sizes by injection molding, flow molding, and other processes. The great flexibility and versatility of plastics creates greater design possibilities for various articles, making the production of such articles more attractive from economic and efficiency standpoints. However, the manufacture of articles from plastics, or plastics with filler materials added, requires a plastics treatment system and molding system for converting solid plastic material to a liquid form, for the addition of filler materials and for flow and/or injection into molding dies to form the desired part.

In the past, treatment and conveying systems for plastics and plastics combined with filler materials have required complex and cumbersome apparatus for both melting and mixing the various materials. It is generally the case that a solid plastic material is melted to liquid form, the filler material being added in solid particulate form, and the two being mixed in some fashion for delivery to the injection or flow molding apparatus. Problems develop in holding the liquid plastic material and the filler material prior to the molding process, where it is necessary to maintain the filler material in suspension. It is necessary to prevent the mixture from settling anywhere in the mixing and holding means, where it may cool and harden to clog the various passages, conduits and the like through which the mixture must pass to the molding dies. Further, in the molding dies themselves, difficulties are often experienced in completely filling the molds, permitting voids and cavities to develop in the molded article, due to imperfect mixing of the filler material with the plastic material and due to imperfect flow of the mixture into the dies. In addition, shrinkage of the material upon cooling within the dies creates difficult design and molding problems, both for the part to be molded and for the molds themselves.

The apparatus and method in which this invention is embodied comprises, generally, a treatment system for plastic and filler materials prior to delivery of the materials to the molding dies, and an injection system which conveys the materials to the molding dies through an injection gun structure in a most efficient and economical manner. The treatment system includes a series of receptacles, each having a different purpose. The first receptacle receives the solid plastic material and heats the material to its melting point. Means are provided to continuously circulate the melted plastic material through the receptacle, the receptacle and circulating means being heated to maintain the plastic material at a desired temperature. A second receptacle, connected by conduit means and valve means to the first receptacle, receives the filler material for combination with the melted plastic material, and continuous circulation of the mixture through the second receptacle maintains the filler material in complete suspension for proper formation of the article of manufacture. A third receptacle, connected by conduit means and valve means to the mixing receptacle, serves to hold the mechanical mixture in readiness for delivery to the molding dies. Again, continuous circulation of the mixture through the receptacle maintains the filler material in its desired suspension so that, upon conveyance to the molding dies, the liquid material will be in its proper form. An injection gun is connected to the system from the holding receptacle, and an injection press is adapted to move the injection gun into and out of engagement with the molding dies for flow of material through the gun and into the dies as desired. In the injection molding gun is a passage communicating directly with the molding dies, and through which the mixture passes, and aligned with the passage is a chamber that receives the plastic material prior to passage to the dies. A piston and cylinder arrangement, with the piston rod entering the chamber, permits the pressurizing of the mixture after flow into the mold, to inject under great pressure a charge of mixture material during cooling in the mold. Injection of such charge under pressure serves to fill any voids and to overcome the shrinkage of the material as it cools. Upon removal of the injection molding gun from the molding dies, a second piston and cylinder arrangement, with a piston rod insertable into the flow passage in the gun, permits the gun to be cleared of any mixture residue that could harden and interrupt the flow passage.

The formation and use of such apparatus and method provides complete temperature control for the plastic material at all stages of preparation, so that the material is properly prepared prior to entry into the molding dies. Continuous circulation of the materials in the various stages also maintains the mixture in its proper form and prevents the material from collecting and hardening in the various parts of the system to create blocks for the movement of the material through the system. The apparatus and method are particularly adaptable to thermoplastic materials to which a filler material is added, and can be used with all materials that heat will liquify. Almost any filler material can be added to the thermoplastic material, so long as the fillers or additives leave the plastic material in sufficient liquid form to allow continuous circulation through the various receptacles and allow movement to the molding dies. The amount and weight of solids added to the plastic material are limited only by the ability of the circulating means to keep the mixture in constant suspension. In the molding dies, material can be added under great pressure to eliminate voids in the part which might develop while the mixture is cooling and after the main flow of the mixture is returned to circulation through the holding receptacle.

These and other advantages will become apparent from the following description used to illustrate a preferred embodiment of the invention when taken with the accompanying drawings in which:

FIG. 6 is a view of a modification of a portion of the system illustrated in FIG. 1.

Figure 1:
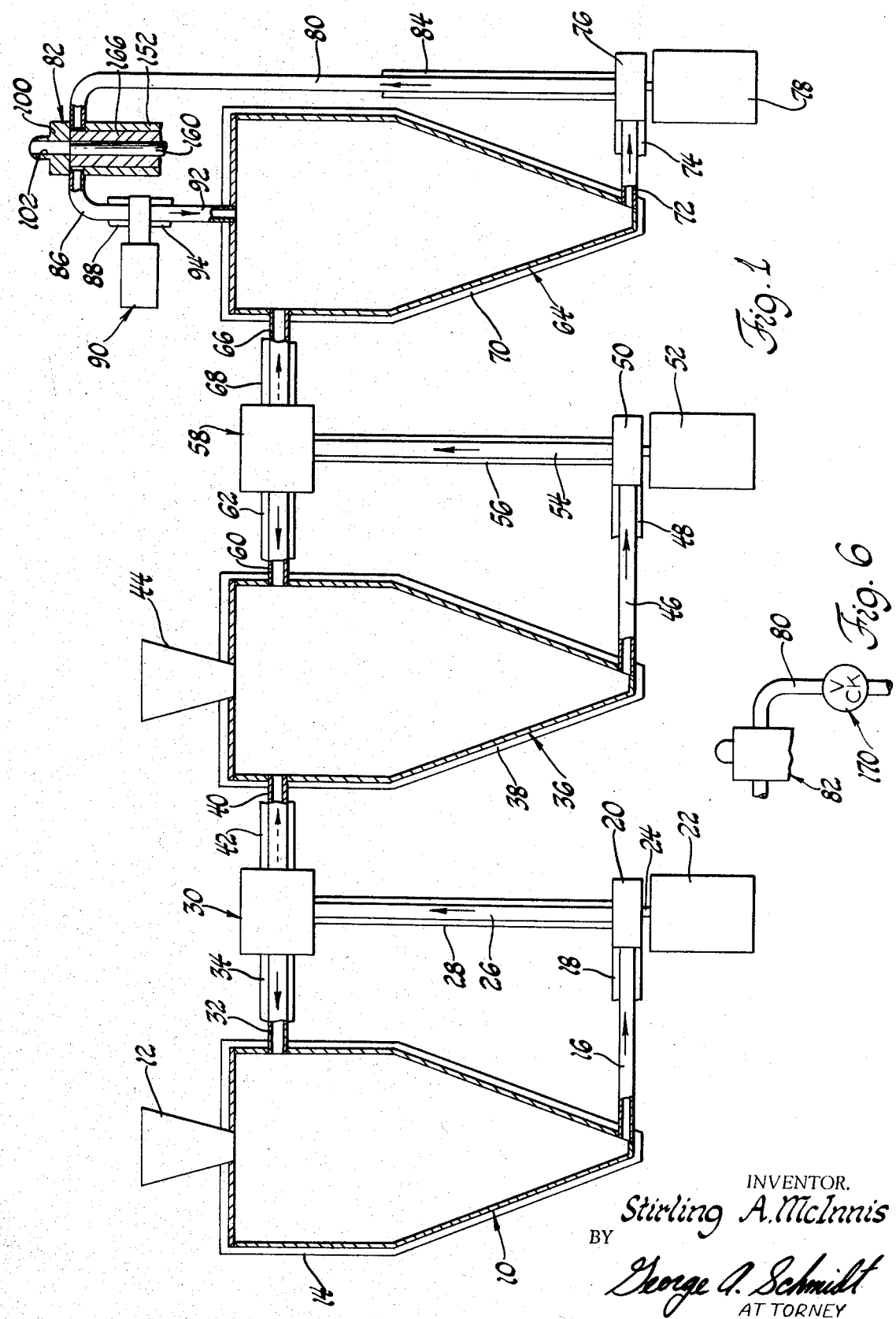
FIG. 1 is a schematic view illustrating the pre-treatment system where the plastic material is liquified, mixed with filler material and circulated.

Referring more particularly to the drawings, where the showings are for the purpose of illustrating a preferred embodiment of the invention only and not for the purpose of limiting same, FIG. 1 illustrates the pre-treatment or preparatory system for preparing the mixture of plastic material and filler material for delivery to the molding dies. A melting receptacle, indicated generally by the numeral 10, is shown to be of generally conical shape and on which is mounted a hopper 12 to permit loading the receptacle 10 with a solid plastic material for melting therein. It is important that the interior walls of the receptacle 10 be smooth and continuous, without ledges, obstructions or the like, on which the plastic material can collect, harden and build-up to interfere with the operation of the system. Receptacle 10 is heated by a suitable heating jacket 14 to maintain the receptacle and the plastic material therein at such temperature as will melt the plastic material from solid form, as introduced through the hopper 12, to liquid form for flow through the remainder of the system.

At the lower end of the receptacle 10 is a conduit 16 which is heated by a jacket 18 to maintain the plastic material at suitable temperature. Conduit 16 leads to a pump 20, suitably operated by a motor, or other driving device, 22 through a shaft 24. The pump 20 is preferably of the centrifugal type for optimum operation; however, other well known types of pumps may be used in the installation. Extending from the outlet of the pump 20 is a conduit 26, heated by a suitable jacket 28, and extending to a valve structure, indicated at 30, for purposes to become hereinafter more apparent. Extending from the valve 30 and back to the receptacle 10 is a conduit 32, suitably heated by a jacket 34 and discharging into the receptacle 10, as illustrated in FIG. 1. With the pump operating and the valve 30 in suitable position, it will be apparent that the plastic material, once it is liquified or melted, will be continuously circulated through the receptacle 10, the conduit 16, pump 20, conduit 26, valve 30 and conduit 32. The respective heating jackets maintain the liquid plastic material at its liquifying temperature at all times.

A second receptacle, indicated generally by the numeral 36, is surrounded by a heating jacket 38 and is connected to the valve 30 by a conduit 40, suitably heated by a jacket 42. A hopper 44 permits loading of the receptacle 36 with a filler material for combination with the liquid plastic material, as will become hereinafter more apparent. Receptacle 36 is also generally conical in shape and it is important to maintain the interior surfaces thereof smooth and unobstructed to prevent collection and build-up of the material within the receptacle 36.

At the lower end of the receptacle 36 is a conduit 46, heated by a jacket 48, which leads to a second pump 50 driven by a motor or the like 52. Extending from the pump outlet is a conduit 54, heated by a jacket 56, and leading to a valve, indicated by the numeral 58. A conduit 60, heated by a jacket 62, extends from the valve structure to the receptacle 36. With the motor 52 and the pump 50 operating, the material within the mixing receptacle 36 can be caused to circulate continuously through the receptacle 36, the conduit 46, pump 50, conduit 54, valve 58 and conduit 60.

The material added to the receptacle 36 through the hopper 44 is a suitable filler material, as will be hereinafter more particularly described, that is to be mixed with the liquid plastic material from the melting receptacle 10 and conveyed to the mixing receptacle 36 through the valve 30. The two materials, liquid plastic from the conduit 40 and filler material from the hopper 44, mechanically mix, by means of the continuous circulation through the receptacle 36, so that the filler material is in suspension in the plastic material in accordance with the design parameters of the article to be manufactured.

A third receptacle, indicated generally by the numeral 64, is connected to the mixing receptacle 36 through the valve 58 and a conduit 66, the conduit 66 being heated by a jacket 68. Receptacle 64, also generally conical in form, is provided with smooth and unobstructed inner surfaces to prevent collection and build-up of the material therein, and is maintained at heat by a suitable heating jacket 70. A conduit 72, extending from the lower end thereof and maintained at heat by a heating jacket 74, leads to a third centrifugal pump 76 operated by a motor or the like 78. A conduit 80 extends from the outlet of the pump 76 to an injection molding gun, illustrated generally by the numeral 82 and which will be hereinafter more particularly described. Conduit 80 is heated by a suitable heating jacket 84 to maintain the material flowing therethrough at proper temperature. On the opposite side of the injection gun 82 is a conduit 86, heated by a jacket 88, that leads to a suitable valve, indicated by the numeral 90, for purposes to become hereinafter more apparent. A conduit 92 extends from the valve 90 and is heated by a jacket 94 to return the material to the holding receptacle 64. It will be apparent that with the pump 76 operating, the mixture may be introduced into the receptacle 64 through the conduit 66 from the mixing receptacle 36, and will continuously circulate through the receptacle 64, through the conduit 72, pump 76, conduit 80, conduits 86 and 92. The structure of the gun 82, as will become hereinafter more apparent, has one condition of operation in which flow of the mixture passes straight through the gun 82 from the conduit 80 to the conduit 86 and the gun is out of operation. At such time, and as controlled by the valve 90, continuous circulation of the mixture through the holding receptacle 64 maintains the plastic material and filler material in the desired mechanical mixture and suspension for optimum formation of the article to be manufactured.

The molding gun 82 includes a housing 100 having a passage 102 formed therethrough. As will be hereinafter described, passage 102 communicates with a chamber which is open to the flow passage from the conduit 80 to the conduit 86, so that upon operation of the valve 90 to close the conduit 86, the mixture will flow into the passage 102 and into the molding dies. Upon opening of the valve 90, flow resumes from the conduit 86 to the conduit 92 and back to the receptacle 64.

Figure 2:
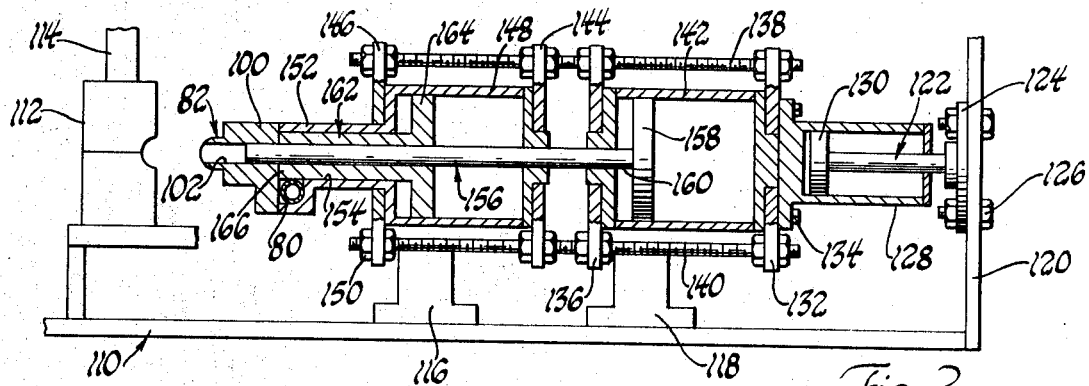
FIG. 2 is an elevational view, with parts broken away and in section, to illustrate the injection molding system for the molding dies and showing the parts in one position of operation.
Figure 3:
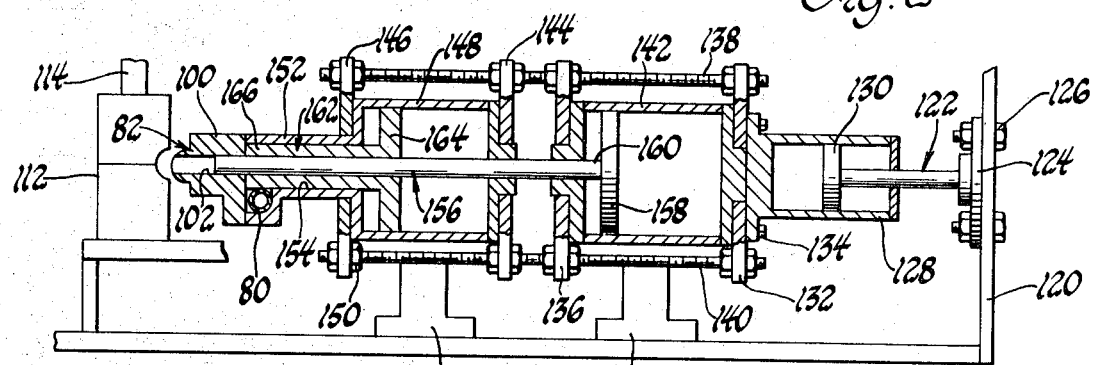
FIG. 3 is a view similar to FIG. 2 showing the apparatus in a second position of operation.
Figure 4:
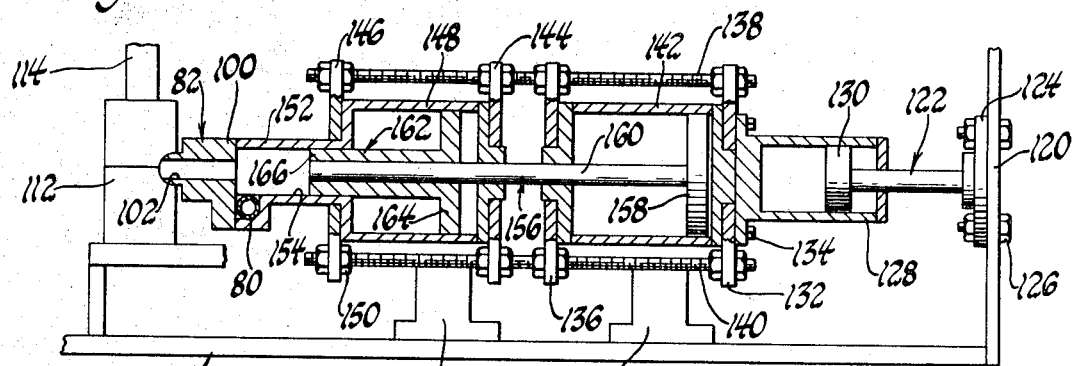
FIG. 4 is a view similar to FIG. 2 showing the apparatus in yet another position of operation.
Figure 5:
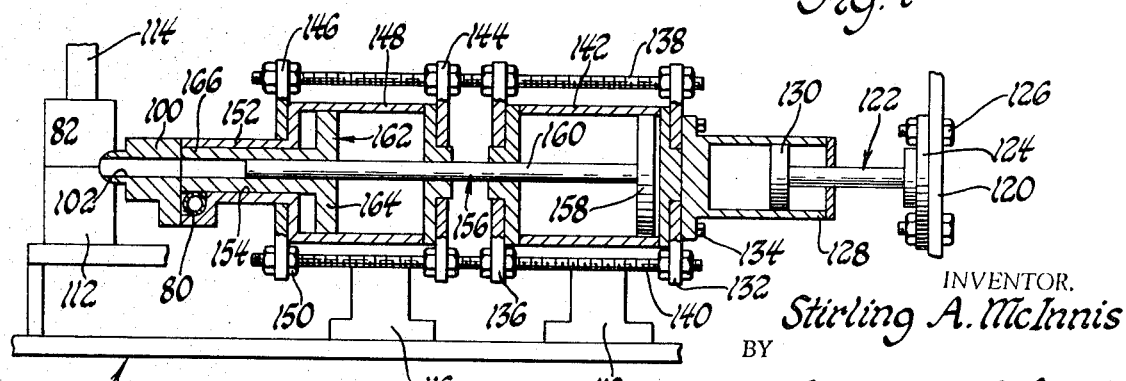
FIG. 5 is a view similar to FIG. 2 showing the apparatus in still another position of operation.

With reference now to FIGS. 2–4, the injection molding press will now be described. A frame structure, indicated generally by the numeral 110, supports molding dies 112 which may be of any suitable size and shape to contain the desired mold cavities in the well known manner. A die clamp assembly, not shown, is part of the machine and includes a pressure piston 114 to hold the die parts together in the manner known in the art. Suitable support members 116 and 118 are mounted on the frame 110 to support the actuating portion of the machine. At the rearward end of the frame 110 is a wall 120 to which is secured a power piston, indicated generally by the numeral 122, the piston being mounted on a plate 124 secured to the wall 120 by nut and bolt assemblies 126. Power piston 122 is received in a power cylinder 128, the piston having a piston head 130 reciprocable in the cylinder 128. Cylinder 128 is connected to a plate 132, by means of bolt assemblies 134, plate 132 and a similar plate 136 being clamped together by tie-bolts 138 and 140 to clamp therebetween a second cylinder 142. Clamping plates 144 and 146, also disposed on the tie-bolts 138 and 140, clamp therebetween another cylinder 148 which is axially aligned with the cylinder 142 for purposes to become hereinafter more apparent. A series of nuts 150 threaded on the tie-bolts 138 and 140 position and lock the clamping plates 132, 136, 144 and 146 in proper clamping engagement wtih cylinders 142 and 148.

Cylinder 148 has a hollow outward extension 152 which is secured in any suitable manner to the injection molding gun 82 and defines a chamber 154, as best illustrated in FIG. 4, the chamber communicating with the mixture flow conduits 80 and 86 for flow of material thereinto. Chamber 154 communicates with the passage 102 in the gun housing 100 for delivery of the mixture to the dies 112.

Reciprocably mounted in cylinder 142 and extending through the cylinder 148 is a piston member, indicated generally by the numeral 156, having a piston head 158 slidable in the cylinder 142 and a piston rod 160 which can extend into the passage 102 in the gun housing 100. Mounted in cylinder 148 is a piston assembly, indicated generally by the numeral 162, being coaxially mounted on the piston rod 160 of the piston assembly 156. Piston rod assembly 162 includes a piston head 164 reciprocable in the cylinder 148 and a piston rod portion 166 receivable in the cylinder extension 152 and in the chamber 154. It is necessary that the cylinders 142 and 148 be axially aligned so that the piston assemblies 156 and 162 can be coaxially mounted as indicated in FIGS. 2–5.

The structure described in the foregoing is for the purpose of preparing and injecting a mixture of a thermoplastic material and filler material into molding dies to manufacture a desired part. Almost any thermoplastic material may be used. Acrylonitrile-butadiene-styrene, commonly referred to as ABS and manufactured under the trade names "Goodrite," "Kralastic" or "Cycolac" to name a few, nylon and polyethylene, are typical examples of plastic materials that might be used. Likewise, almost any filler material may be mixed with the thermoplastic material, in the form of glass or synthetic fibers, particulate aluminum powder, woodflour, particulate asbestos and mica, to name a few. The particular plastic material and the particular filler that are used depend upon the design requirements of the article to be formed, it being only important to the process and structure that the amount and particular combination of materials be such as to provide a liquid mixture, viscous enough to be pumped through the various receptacles and into the molding dies, and be such as to completely mix into a mechanical suspension of the filler material in the liquid plastic with complete wetting of the filler material by the plastic material.

With reference once again to FIG. 1, the preparation of the mixture for delivery to the molding dies will now be described. With the melting receptacle 10 being suitably brought to sufficient heat for melting the plastic material, and with ABS such temperature may be in the neighborhood of 500° to 550° Fahrenheit, the plastic material in solid form is loaded into the melting receptacle 10 through the hopper 12. As the material is brought to melting temperature and liquifies, the material is pumped through the conduit 16, conduit 26, valve 30 and conduit 32 by the pump 30 and motor 22, and is continuously circulated through the receptacle 10 for as long as is necessary, maintaining the plastic material at melting temperature.

As the plastic material is needed for mixing, the valve 30 is operated to divert liquid flow through the conduit 40 to the mixing receptacle 36, which is held at sufficient temperature to keep the plastic material at sufficient viscosity for complete wetting of the filler particles. The filler material is introduced into the receptacle 36 through the hopper 44 in sufficient proportions and in suitable form to mix with the liquid plastic material, as required by the design parameters of the final article of manufacture. The heating jacket 38 maintains the receptacle 36 at sufficient temperature to keep the mixture in liquid condition, and continuous circulation through the conduits 46, 54 and 60, and through the receptacle 36 maintain the filler particles in mechanical suspension in the mixture. Circulation continues through the sub-system until such time as the mixture is needed in the holding receptacle 64, at which time the valve 58 is operated to divert flow through the conduit 66 and into the holding receptacle 64.

The pump 76, operated by the motor 78, maintains continuous circulation through the receptacle 64 and the conduit system associated therewith to maintain the mixture and the suspension of the filler particles in the mixture. The temperature in the receptacle 64, maintained by the heating jacket 70, is sufficient to maintain the mixture at close to the solidifying temperature, but still allowing the material to flow and keep the filler material in suspension. The temperature range in the receptacle 64 and associated circulating system is important to the molding process, and more particularly to time considerations for cooling the molded part. Valve 90 is maintained in its open condition to keep continuous circulation through the receptacle 64. So long as the piston rod 166 is in the position illustrated in FIG. 1, there can be no flow from the conduit 80 to the chamber 154, and thus to the passage 102 in the injection gun 82.

The overall system can thus remain in continuous circulation through the various receptacles 10, 36 and 64 as necessary. The valves 30 and 58 are normally positioned to maintain circulation, but as material is dispensed from one receptacle to another, or through the gun 82, flow may be diverted by operation of the valves to replenish the supply in the next receptacle.

With reference once again to FIGS. 2–5, the operation of the injection mechanism will now be described. Assuming first that the parts are in the position shown in FIG. 2, where the injection gun 82 is displaced from the molding dies 112, flow from the conduit 80 to the chamber 154 is blocked by the piston rod portion 166. At such time as it is desired to deliver liquid to the molding dies 112, the power piston 122 and cylinder 128 are actuated by introducing a fluid to the left-hand side of the piston head 130, thus driving the remainder of the mechanism toward the molding dies 112 on the supports 116 and 118. This action is illustrated in FIG. 3, showing the entire mechanism approaching the molding dies 112 under the movement of the cylinder 128 along the piston 122. When the injection gun 82 is properly positioned relative to the molding dies 112, the piston member 156 is withdrawn in the cylinder 142 by applying pressure to the leftward side of the piston head 158, thus removing the piston rod 160 from the passage 102 in the housing 100. At the same time, fluid under pressure at the leftward side of piston head 164 of piston assembly 162 withdraws the piston assembly 162 from the chamber 154 to open communication between the conduit 80 and chamber 154, and thus with the passage 102 and into the molding dies. Operation of the pump 76, and closing of the valve 90, causes mixture flow through the chamber 154 and passage 102 into the molding dies 112 and such continues until the dies are full.

Upon filling, and as the plastic material within the dies begins to cool, power piston 162 is actuated toward the left, by pressure on the right-hand side of the piston head 164, thus injecting the material remaining in the chamber 154 and the passage 102 into the molding dies 112. Such injection fills any voids or cavities in the molding dies 112 and compensates for any shrinkage that may occur as the material cools and solidifies in the dies 112. The movement of the piston rod 166 of the piston assembly 162 into the chamber 154 also serves to cut off communication between the conduit 80 and the passage 102, so that upon opening of the valve 90 continued circulation through the holding receptacle 64 is resumed.

Upon withdrawal of the mechanism from the dies 112, by introducing pressure to the right-hand side of piston head 130 in the power cylinder 128, toward the position of the parts as illustrated in FIG. 2, the piston assembly 156 may be actuated by pressure on the right-hand side of the piston head 158 to drive the piston rod 160 into the passage 102 and thus clear the passage from any residue of mixture left therein. Thus, the passage 102 is kept clear of any interference with liquid flow.

Upon completion of the cycle, the parts will again be in substantially the position illustrated in FIG. 2. The cycle may be repeated as often as desirable or necessary, allowing time for the material to completely solidify in the molding dies 112, whereupon the dies may be opened and the part removed. During the cooling period for the dies, the mixture of plastic material and filler material is returned to continuous circulation through the holding receptable 64, maintaining the suspension of the filler particles in the mixture.

With reference now to FIG. 6, and should it be desirable to provide some sort of control to prevent return flow through the conduit 80 in the reverse direction as a result of the injection pressure, a check valve 170 may be provided in the conduit 80. Such check valve 170 will permit free flow in the circulating direction, as a result of the operation of the pump 76, but is formed to block flow in the reverse direction; that is, from the gun 82 toward the pump 76. In this manner, upon injection by means of piston 162 in the cylinder 148, a reverse flow toward the pump will not be established.

Thus, apparatus and method for preparing and injecting a mixture of plastic material and a filler material into molding dies are provided. The apparatus is extremely simple to manufacture and produce, is efficient and economical to operate, and provides an article of manufacture which is more uniform by avoiding the shrinkage problem normally present in molding plastic material. The continuous circulation of the plastic material in liquid form and/or the mixture of plastic material and filler material, through smooth sided, unobstructed receptacles and conduits, maintains the filler material in suspension in the mixture for optimum distribution in the molded part. The pumping and valving systems provide free and easy flow of the material and permit temperature control to maintain the mixture at the desired liquid state and viscosity to accomplish the desired purposes.

The present invention has been described in connection with certain structural embodiments; however, it is to be appreciated that various changes may be made in the structural embodiments without departing from the intended spirit and scope of the present invention as defined in the appended claims.

Having thus described the invention, I claim:

1. A system for preparing a mixture of plastic material and filler material and for injecting said mixture into molding dies and comprising:

means for receiving said plastic material and continuously circulating said material in liquid state therethrough;

means for receiving said plastic material in liquid state from said first named means and receiving said filler material for mixture therewith and continuously circulating said mixture therethrough;

holding means for receiving said mixture from said second named means;

injection means operably connected to said molding dies and including a mixture receiving chamber and reciprocable means reciprocable into and out of said chamber for forcing mixture from said chamber into said molding dies;

and means for conveying said mixture from said holding means to said injection means and continuously circulating said mixture through said injection means and said holding means when said reciprocable means is in said chamber and for conveying mixture to said chamber when said reciprocable means is out of said chamber.

2. The system set forth in claim 1 and further including means for heating said first named means and said second named means and said holding means.

3. The system set forth in claim 2 wherein said first named means are heated to a temperature sufficient to melt solid plastic material to liquid state.

4. The system set forth in claim 2 wherein said second named means are heated to a temperature sufficient to maintain said liquid plastic material at a viscosity for wetting the particles of said filler material and fully mixing said particles with said plastic material.

5. The system set forth in claim 2 wherein said holding means are heated to a temperature above the solidifying temperature of said plastic material and as close to said solidifying temperature as will permit said mixture to flow into said molding dies.

6. The system set forth in claim 1 wherein said first named means includes a receptacle having an outlet and an inlet and continuous unobstructed inner surfaces, heating means for said receptacle to maintain said receptacle at sufficient temperature to melt said plastic material and maintain said plastic material at a mixing temperature, conduit means extending between said outlet and said inlet, pump means in said conduit means for continuously circulating liquid plastic material through said conduit means and said receptacle, and a valve in said conduit means and operable to selectively transfer said liquid plastic material to said second named means.

7. The system set forth in claim 1 wherein said second named means includes a receptacle having an outlet and an inlet and continuous unobstructed inner surfaces, heating means for said receptacle to maintain said receptacle at sufficient temperature to maintain said plastic material at a viscosity for complete wetting and mixing with said filler material, conduit means extending between said outlet and said inlet, pump means in said conduit means for continuously circulating said mixture through said conduit means and through said receptacle, first valve means operatively connected to said first named means and operable to direct said liquid plastic material from said first named means to said receptacle, and a second valve means in said conduit means and operable to transfer said mixture to said holding means.

8. The system set forth in claim 1 wherein said holding means includes a receptacle having an outlet and an inlet and continuous unobstructed inner surfaces, heating means for said receptacle to maintain said receptacle at sufficient temperature to maintain said mixture at a temperature above the solidifying temperature thereof and in such state as to be flowable from said receptacle, conduit means extending between said outlet and said inlet, pump means in said conduit means for continuously circulating said mixture through said conduit means and through said receptacle, first valve means operatively connected to said second named means for directing said mixture from said second named means to said receptacle, and second valve means in said conduit means and operable to cut off circulation flow of said mixture when said reciprocable means is out of said chamber.

9. A system for preparing and injecting a mixture of liquid plastic material and filler material into molding dies and comprising:
  a heated melting receptacle having continuous and unobstructed inner surfaces;
  means for loading said melting receptacle with plastic material in solid form for melting therein;
  means for continuously circulating said plastic material after melting through said receptacle;
  a heated mixing receptacle having continuous and unobstructed inner surfaces;
  means for conveying liquid plastic material from said melting receptacle to said mixing receptacle;
  means for loading said mixing receptacle with filler material for combination with said liquid plastic material from said melting receptacle to form a mixture;
  means for continuously circulating said mixture through said mixing receptacle;
  a heated holding receptacle having continuous and unobstructed inner surfaces;
  means for conveying said mixture from said mixing receptacle to said holding receptacle;
  injection means operably connected to said molding dies and including a mixture receiving chamber and reciprocable means reciprocable into and out of said chamber for forcing mixture from said chamber into said molding dies;
  and means for conveying said mixture from said holding means to said injection means and continuously circulating said mixture through said injection means and said holding means when said reciprocable means is in said chamber and for conveying mixture to said chamber when said reciprocable means is out of said chamber.

10. The system set forth in claim 9 wherein said melting receptacle is heated to a temperature sufficient to melt the solid plastic material loaded therein and maintain said plastic material at a mixing temperature.

11. The system set forth in claim 9 wherein said mixing receptacle is heated to a temperature sufficient to maintain said plastic material at sufficient viscosity for wetting the particles of said filler material and fully mixing therewith and to put said particles in suspension in said mixture.

12. The system set forth in claim 9 wherein said holding receptacle is heated to a temperature above the solidifying temperature of said mixture and as close to said solidifying temperature as will permit said mixture to flow into said dies.

13. The system set forth in claim 9 wherein said means for circulating said plastic material through said melting receptacle includes a conduit extending between an outlet from said receptacle and an inlet to said receptacle, pump means connected in said conduit means and operable to circulate said plastic material therethrough, and valve means in said conduit for selectively directing said plastic material to either said melting receptacle or said mixing receptacle.

14. The system set forth in claim 9 wherein said means for circulating said mixture through said mixing receptacle includes a conduit extending between an outlet from said receptacle and an inlet to said receptacle, pump means connected in said conduit and operable to circulate said material therethrough, and valve means in said conduit for selectively directing said mixture to either said mixing receptacle or to said means for conveying said mixture to said holding receptacle.

15. The system set forth in claim 9 wherein said means for circulating said mixture through said holding receptacle and said injection means includes a conduit extending between an outlet from said receptacle and said chamber and from said chamber to an inlet to said receptacle, pump means connected in said conduit and operable to circulate said mixture therethrough, and valve means in said conduit for selectively directing said mixture to either said holding receptacle or said chamber.

16. A system for preparing and injecting a mixture of plastic material and filler material into molding dies and comprising:
  means for receiving and continuously circulating said plastic material and said filler material to maintain said filler material in suspension in said plastic material;
  a frame;
  an injection gun housing moveably mounted on said frame and having a first passage therein adapted to communicate with an opening in said molding dies and a second passage therein communicating with said first passage;
  means for conveying said mixture from said circulating means to said second passage and from said second passage to said circulating means and continuously circulating said mixture through said circulating means and said second passage;
  means mounted on said frame for selectively moving said housing into or out of engagement with said molding dies;
  means mounted on said frame and moveable in said housing to selectively open or close communications between said first passage and said second passage, said means being operable to inject a portion of said mixture through said first passage after said molding dies are filled from said second passage;
  and means mounted on said frame and moveable into and out of said first passage after injection of said mixture therethrough to clean said first passage.

17. The injection means set forth in claim 16 wherein said means for moving said housing includes a power cylinder mounted on said frame.

18. The injection means set forth in claim 16 wherein said means for opening and closing communication between said second passage and said first passage includes a power cylinder mounted on said frame.

19. The system for preparing and injecting a mixture set forth in claim 16 wherein said circulating means includes a melting receptacle having a conduit from the outlet thereof to an inlet thereof, a mixing receptacle having a conduit from the outlet thereof to an inlet thereof, a holding receptacle having a conduit from the outlet thereof to an inlet thereof, first conduit means connecting said conduit of said melting receptacle and said mixing receptacle, second conduit means connecting said conduit of said mixing receptacle and said holding receptacle, pump means in said first conduit means for continuously circulating liquid plastic through said melting receptacle and conveying said mixture to said mixing receptacle, pump means in said second conduit means for continuously circulating said mixture of plastic material and filler material through said mixing receptacle and conveying said mixture to said holding receptacle, and pump means in said conduit of said holding receptacle for conveying said mixture to said means for conveying said mixture from said circulating means to said second passage.

References Cited

UNITED STATES PATENTS

| | | | |
|---|---|---|---|
| 2,557,841 | 6/1951 | Preusser | 259—95 |
| 2,816,321 | 12/1957 | Hutchcroft et al. | 18—30 |
| 2,915,023 | 12/1959 | Rapaport | 259—95X |
| 3,253,303 | 5/1966 | Bradt | 18—30 |
| 3,371,912 | 3/1968 | Samler et al. | 259—95 |

J. SPENCER OVERHOLSER, Primary Examiner

M. O. SUTTON, Assistant Examiner

U.S. Cl. X.R.

18—5, 30; 264—329